United States Patent
Blomgren et al.

(10) Patent No.: US 9,417,843 B2
(45) Date of Patent: Aug. 16, 2016

(54) EXTENDED MULTIPLY

(71) Applicant: Apple Inc., Cupertino, CA (US)

(72) Inventors: James S. Blomgren, Austin, TX (US); Terence M. Potter, Austin, TX (US)

(73) Assignee: Apple Inc., Cupertino, CA (US)

( * ) Notice: Subject to any disclaimer, the term of this patent is extended or adjusted under 35 U.S.C. 154(b) by 401 days.

(21) Appl. No.: 13/971,753

(22) Filed: Aug. 20, 2013

(65) Prior Publication Data

US 2015/0058389 A1    Feb. 26, 2015

(51) Int. Cl.
  *G06F 17/10* (2006.01)
  *G06F 7/525* (2006.01)

(52) U.S. Cl.
  CPC .................................. *G06F 7/525* (2013.01)

(58) Field of Classification Search
  None
  See application file for complete search history.

(56) References Cited

U.S. PATENT DOCUMENTS

| | | | |
|---|---|---|---|
| 5,313,530 A | 5/1994 | Iwamura | |
| 5,502,665 A | 3/1996 | Im | |
| 5,524,090 A | 6/1996 | Iwamura | |
| 5,909,385 A | 6/1999 | Nishiyama et al. | |
| 5,974,435 A * | 10/1999 | Abbott | G06F 7/5324 708/523 |
| 2014/0006755 A1 * | 1/2014 | Gueron | G06F 9/3001 712/222 |

* cited by examiner

Primary Examiner — Michael D Yaary
(74) Attorney, Agent, or Firm — Meyertons, Hood, Kivlin, Kowert & Goetzel, P.C.; Michael B. Davis

(57) ABSTRACT

Techniques are disclosed relating to performing extended multiplies without a carry flag. In one embodiment, an apparatus includes a multiply unit configured to perform multiplications of operands having a particular width. In this embodiment, the apparatus also includes multiple storage elements configured to store operands for the multiply unit. In this embodiment, each of the storage elements is configured to provide a portion of a stored operand that is less than an entirety of the stored operand in response to a control signal from the apparatus. In one embodiment, the apparatus is configured to perform a multiplication of given first and second operands having a width greater than the particular width by performing a sequence of multiply operations using the multiply unit, using portions of the stored operands and without using a carry flag between any of the sequence of multiply operations.

20 Claims, 6 Drawing Sheets signed mul32:
imul r2, r0l,r1l                    // r3:2 ← r1 x r0
                                    // r2 ← r0l x r1l;
imad r3, r0h.s,r1l ,r2h             // r3 ← r0h x r1l + r2h;
imad r2H,r0l ,r1h.s,r3l             // r2h ← r0l x r1h + r3l;
imadh r3, r0l ,r1h.s,r3             // r3 ← (r0l x r1h + r3)>>16;
imad r3, r0h.s,r1h.s,r3             // r3 ← r0h x r1h + r3;

FIG. 4A unsigned mad64:
imad r2l, r0l, r1l, r4              // r3:2 ← r1 x r0 + r5:4
imadh r3, r0l, r1l, r4              // r2 ← r0l x r1l + r4;
imad r3, r0h, r1l, r3               // r3 ← (r0l x r1l + r4)>>16;
imad r2h, r0l, r1h, r3l             // r3 ← r0h x r1l + r3;
imadh r3, r0l, r1h, r3              // r2h ← r0l x r1h + r3l;
imad r3, r0h, r1h, r3               // r3 ← (r0l x r1h + r3)>>16;
iadd r3, r3, r5                     // r3 ← r0h x r1h + r3;
                                    // r3 ← r3 + r5;

```
┌─────────────────────────────────────────────────┐
│ Perform a sequence of multiply operations using │
│ a multiplier circuit configured to perform      │
│ multiplications of operands having a maximum    │
│ width that is smaller than a particular width   │
│ of two operands of a multiplication.            │
│                     510                         │
└─────────────────────────────────────────────────┘
                        │
                        ▼
┌─────────────────────────────────────────────────┐
│ Use, for each of the sequence of multiply       │
│ operations, portions of each of the two operands│
│ as inputs to the multiplier circuit, where the  │
│ portions are less than the entirety of each of  │
│ the two operands                                │
│                     520                         │
└─────────────────────────────────────────────────┘
```

FIG. 5

EXTENDED MULTIPLY

BACKGROUND

1. Technical Field

This disclosure relates generally to integer arithmetic, and more specifically to performing extended multiplies without a carry flag.

2. Description of the Related Art

Most processors implement multiply operations as native instructions. These instructions are typically implemented based on the size of the processor datapath. For example, a 32-bit processor is often configured to accept 32-bit inputs and deliver a 64-bit multiplied result. Another approach is to provide two different multiply instructions, one of which provides the lower 32 bits of the 64-bit product and the other of which provides the upper 32 bits of the 64-bit product.

In order to support even larger multiplies, some multipliers provide carry flags or bits to allow stitching together portions of the larger multiply. For example, multiplication of 64-bit input operands may be performed using a multiplier that supports input operands having a maximum size of 32 bits by performing multiple 32-bit multiplications and passing a carry flag to subsequent multiplications. Using this approach, the smaller multiplies are dependent on the carry flag, and a special register for the carry flag typically must be implemented and tracked.

SUMMARY

Techniques are disclosed relating to performing extended multiplies without an architected carry flag. In one embodiment, an apparatus includes a multiply unit configured to perform multiplications of operands having a particular width. In this embodiment, the apparatus also includes storage elements configured to store operands for the multiply unit. In this embodiment, each of the storage elements is configured to provide a portion of a stored operand that is less than an entirety of the stored operand in response to a control signal from the apparatus. In this embodiment, the apparatus is configured to perform a multiplication of given first and second operands having a width greater than the particular width by performing a sequence of multiply operations using the multiply unit, where each of the sequence of multiply operations uses only a portion of the stored operand from one or more of the storage elements as an operand. One or more of the sequence of multiply operations may be multiply-add operations or multiply-add and shift operations. In one embodiment, the apparatus is configured to perform the sequence of multiply operations without using a carry flag between any of the sequence of multiply operations. This may reduce control and/or storage complexity in some embodiments, e.g., compared to implementations that store an extra carry state for each thread in a multi-threaded processor.

BRIEF DESCRIPTION OF THE DRAWINGS

FIGS. 4A-B are diagrams illustrating exemplary operations for extended multiplies.

FIG. 5 is a block diagram illustrating one embodiment of a method for performing an extended multiply.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1:
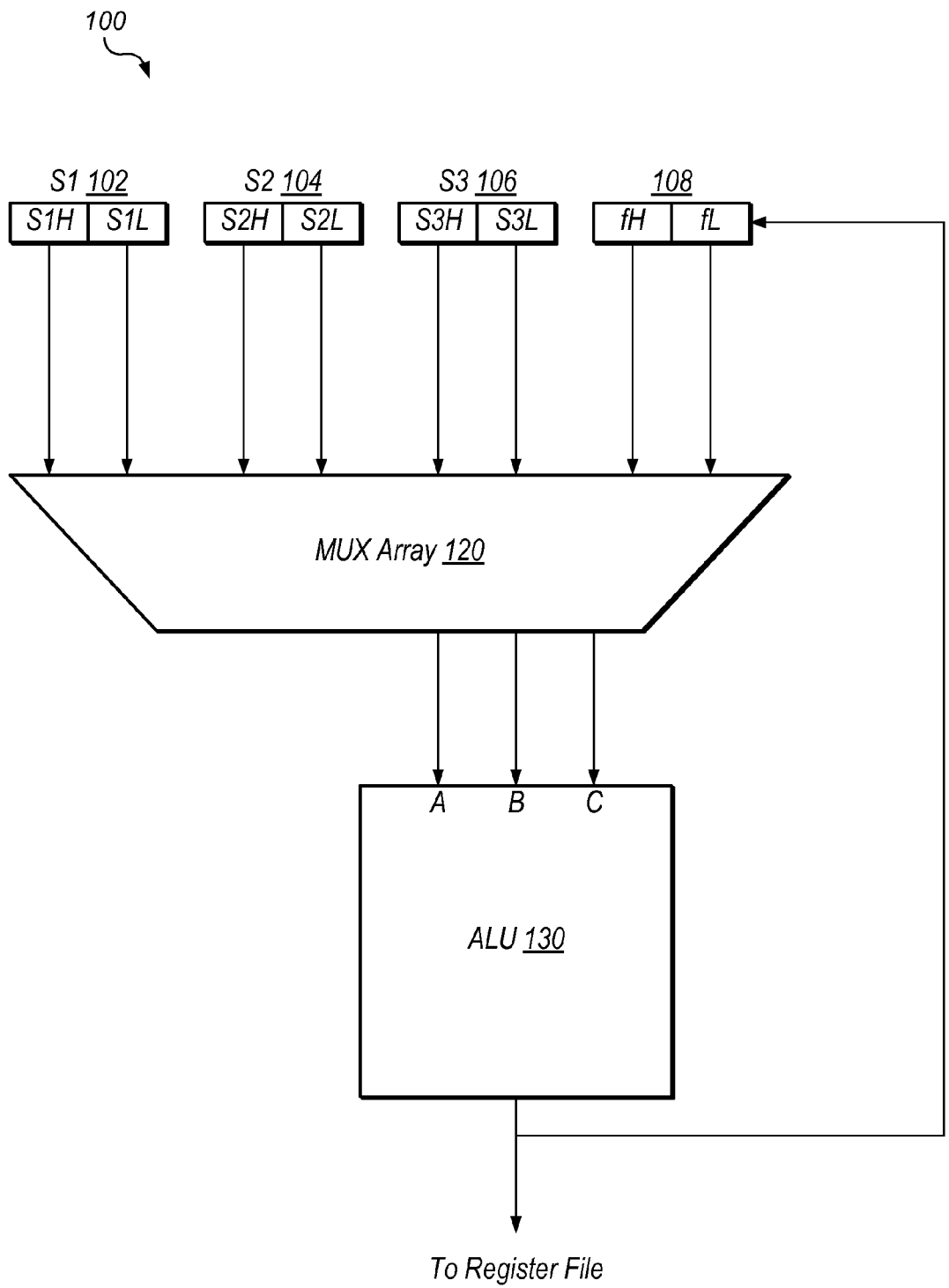
FIG. 1 is a block diagram illustrating one embodiment of a system that facilitates access to operand portions.
Figure 2:
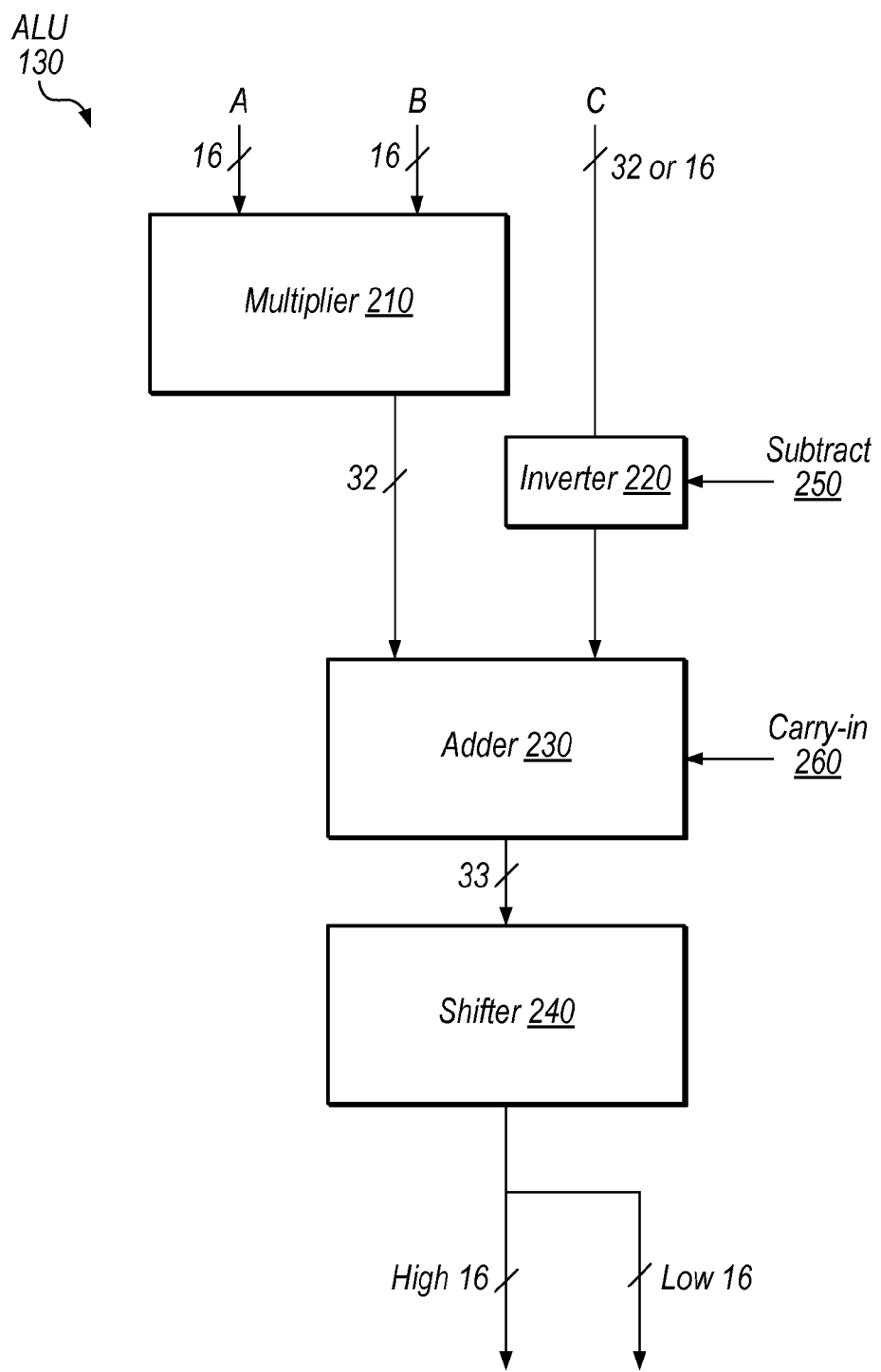
FIG. 2 is a block diagram illustrating one embodiment of an arithmetic logic unit.

This disclosure initially describes, with reference to FIGS. 1-2, an exemplary data path and ALU configured to facilitate execution of a sequence of instructions to perform an extended multiply. It then describes exemplary sequences of operations for performing extended multiplies with reference to FIGS. 3 and 4A-B. Embodiments of a method and an exemplary device are described with reference to FIGS. 5-6.

Referring to FIG. 1, a block diagram illustrating one embodiment of a system 100 that facilitates access to operand portions is shown. In the illustrated embodiment, system 100 includes sources S1-S3 102-106, forwarded result 108, multiplexer (MUX) array 120, and ALU 130. In one embodiment, system 100 is configured to execute a sequence of multiplications using ALU 130 of a smaller number of bits (e.g., a plurality of multiplications with 16-bit input operands) in order to achieve a larger multiplication (e.g., a multiplication with 32-bit input operands). In various embodiments, extended multiplications of various sizes may be performed using multipliers having various maximum operand sizes.

Sources S1-S3 102-106, in one embodiment, are storage elements (e.g., latches or parts of a random access memory) and may be configured to provide operands to ALU 130. In other embodiments, sources S1-S3 102-106 may not be storage elements but may represent transitory signals. Operands for sources S1-S3 102-106 may be read from a register file, for example. Forwarded result 108 may be a storage element or signal which may store or carry a result value from ALU 130 for use as an input operand, e.g., in order to use results more quickly than reading them from a register file after they are written. In the illustrated embodiment, each of source S1-S3 102-106 and forwarded result 108 includes high and low portions (e.g., S1H is the high portion and S1L is the low portion of S1) and these portions are configured to be separately accessed (e.g., S1H can be accessed without accessing S1L). In other embodiments, even smaller portions of sources may be separately accessed. For example, each source may be split into 4, 8, or any number of separately accessible portions in various embodiments. This functionality may be implemented by dividing storage elements or signals for each source into separately accessible portions and/or by providing sources using multiple different storage elements or buses to provide each source, for example.

MUX array 120, in the illustrated embodiment, is configured to select appropriate sources and/or source portions for provision to ALU 130. In one embodiment, MUX array 120 may be configured to perform this selection in response to control signals from a decoder, for example, based on the nature of an operation to be performed by ALU 130. In one embodiment, storage elements for sources S1-S3 are configured to read only a portion of their stored operand in response certain control signals. Examples of operations include, without limitation: add, subtract, multiply, multiply-add, multiply-add and shift, multiply-subtract, etc. In other embodiments, any of various types of circuits may be used to implement the functionality of MUX array 120 such as tri-state buffers, etc.

ALU 130, in the illustrated embodiment, is configured to perform extended multiplications by executing a sequence of smaller multiply operations or instructions. For example, ALU 130 may include a multiplier circuit configured to perform multiplications of operands having a maximum number of bits. In this context, an extended multiplication involves performing a multiplication of input operands having more than the maximum number of bits. In one embodiment, sources S1-S3 102-106 each have more than the maximum number of bits. In some embodiments, ALU 130 is configured to perform extended multiplications by performing a sequence of multiply instructions without using a carry flag between any of the sequence of multiply instructions. The ability to separately access portions of sources S1-S3 in the illustrated embodiment may facilitate this functionality. In the illustrated embodiment, ALU 130 receives three inputs A, B, and C. In one embodiment, ALU 130 may be configured to perform operations such as A*B, A+C, A*B+C, A*B−C, etc. In other embodiments, ALU 130 may include additional inputs and may be configured to perform operations such as A*B+C*D, for example. Thus, in some embodiments, ALU 130 may include units such as one or more multipliers, adders, shifters, and/or inverters. In the illustrated embodiment, ALU 130 is configured to write results to a register file (which may in turn store or provide sources S1-S3 102-106) and/or as a forwarded result 108.

In some embodiments, system 100 may be included in a mobile graphics processing unit (GPU). In these embodiments, power consumption may be an important design consideration. A GPU may include a large number of execution pipelines and each pipeline may include an ALU. Thus, using multipliers configured to accept smaller input operands and performing extended multiplies without a storage element for a carry flag for each thread (or any other carry information) may reduce power consumption and routing overhead. Further, carry flags/bits are typically considered a different operand type from general purpose registers, and may require significant control overhead and dependency checking logic.

Referring now to FIG. 2, a block diagram illustrating one embodiment of an ALU 130 is shown. In the illustrated embodiment, ALU 130 includes a multiplier 210, an inverter 220, an adder 230, and a shifter 240. ALU 130 may be configured to perform various operations such as multiply (e.g., A*B), add (e.g., A+C), subtract (e.g., A+−C using inverter 220 and carry-in 260), multiply-add (e.g., A*B+C), multiply-add high (e.g., A*B+C>>16), multiply-subtract (e.g., A*B+−C), etc. In the illustrated embodiment, operands A and B are 16-bit integers and operand C is a 32-bit or 16-bit integer. In the illustrated embodiment, multiplier 210 is configured to produce a 32-bit result from multiplication of two 16-bit operands A and B. In various embodiments, multiplier 210 may be configured to produce a multiplication result of two operands having a given maximum width. In these embodiments, extended multiplication involves performing multiplication, using multiplier 210, of operands that are larger than the maximum width that multiplier 210 is configured to accept.

In the illustrated embodiment, adder 230 is configured to produce a 33-bit result of adding two 32-bit operands, and shifter 240 is configured to shift a result from adder 230 a specified number of bits to the right. Shifter 240 may be configured to sign extend or add 0's when right shifting, e.g., based on whether a number is signed or unsigned. In the illustrated embodiment, the output of shifter 240 is provided as a high 16 bits and a low 16 bits which may be combined into a 32-bit result or accessed separately (e.g., to access a portion of a forwarded result as discussed above with reference to FIG. 1). In the illustrated embodiment, ALU 130 may be used to perform extended multiplies of input operands having more than 16 bits by performing 16-bit operations, as will be described below with reference to FIGS. 3 and 4A-B.

Inverter 220, in the illustrated embodiment, is configured to invert bits of the C operand, e.g., based on subtract signal 250. In some embodiments, subtraction may involve inverting the bits of C and adding a 1 to a least-significant bit of C. In one embodiment, ALU 130 is configured to set carry-in signal 260 to perform this addition by 1, e.g., based on detecting an opcode of a subtract operation. In some embodiments, carry-in signal 260 is not coupled to a storage element for a carry flag, but rather is set in response to a signal for a current operation by ALU 130. In this embodiment, ALU 130 may be configured to perform sequences of operations for extended multiplication operations without using a carry flag between any of the sequences of operations. In this embodiment, all information for the sequence of operations may be stored in source registers, destination registers, and/or operation specifiers (e.g., instructions), without using other storage for intermediate results of any of the sequence of operations.

In some embodiment, using a carry bit is avoided at least in part by performing some operations twice. For example, in the illustrated embodiment, r0L times r1H is performed twice, which may avoid overflowing the operand size when performing the operation once (which may require a carry flag to keep track of the overflow) by effectively cutting the problem into two smaller pieces.

In various embodiments, ALU 130 may be configured to receive operands having various numbers of bits. The operand and bus sizes of FIG. 2 are exemplary only and are shown in order to facilitate explanation of one particular embodiment of ALU 160 that includes a 16-bit multiplier.

Figure 3:
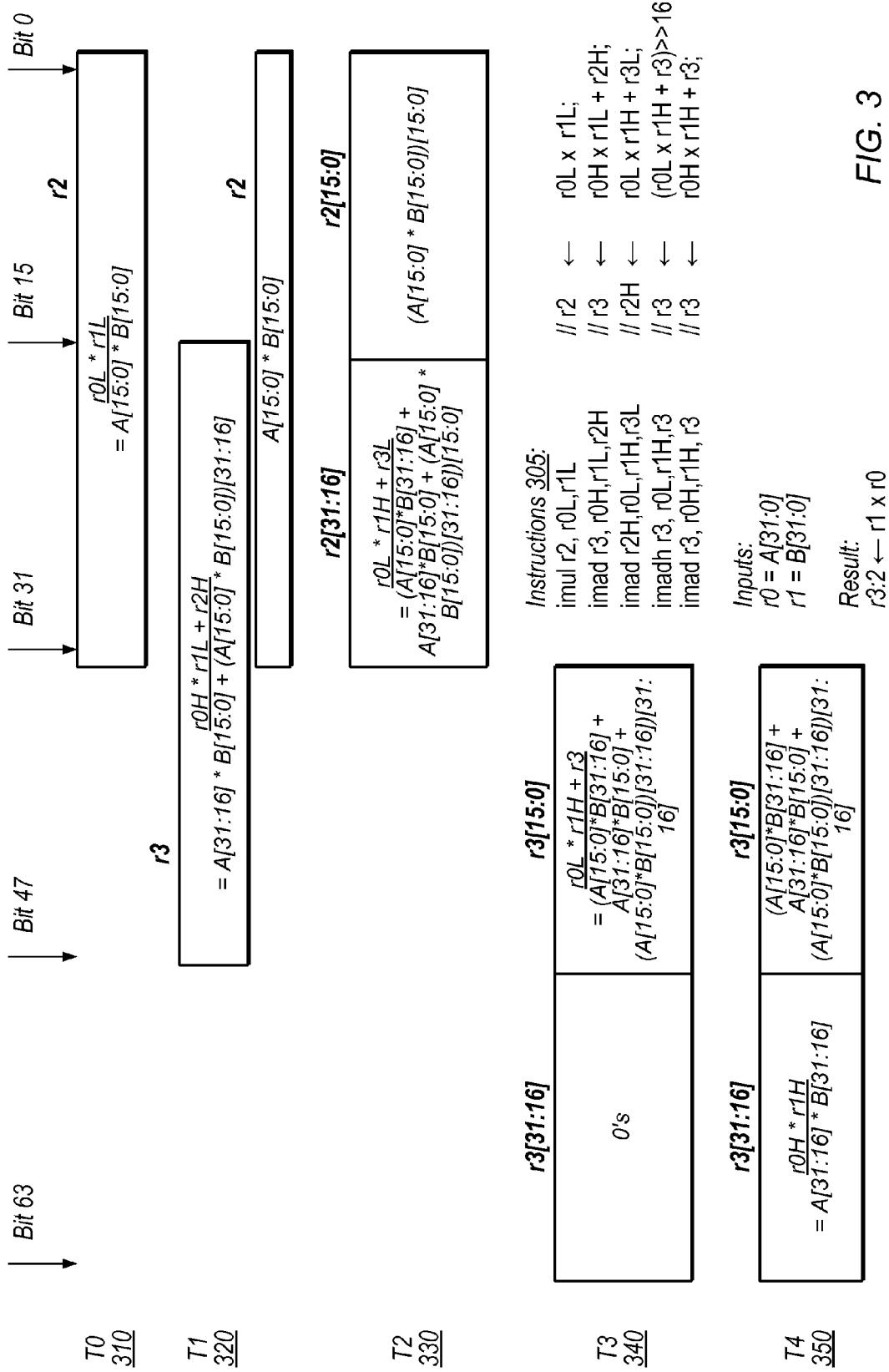
FIG. 3 is a diagram illustrating exemplary execution of an extended multiply.

Referring now to FIG. 3, a block diagram illustrating register states during exemplary execution of extended multiplication according to one embodiment is shown. Exemplary instructions 305 show one embodiment of a sequence of operations to be performed in the illustrated order. Exemplary instructions 305 may be assembled from a higher-level programming language. Thus, in one embodiment, the higher-level programming language may include a single multiplication instruction that is compiled into exemplary instructions 305 in order to perform the multiplication using a multiplier having a maximum size that is too small to implement the single multiplication instruction directly.

In the illustrated example, r0, r1, r2, and r3 are 32-bit registers and a multiplier that accepts inputs having a maximum size of 16 bits is implemented. In the illustrated example, r0 holds a 32-bit unsigned integer operand A[31:0] and r1 holds a 32-bit unsigned integer operand B[31:0]. ALU 130 may execute instructions 305 in order to implement an extended multiply, resulting in r3 and r2 receiving the 64-bit unsigned integer result of r0 multiplied by r1 (A[31:0]×B[31:0]). In the illustrated example, r3 receives the most significant 32 bits of the result while r2 receives the least significant 32 bits of the result. The blocks of FIG. 3 represent various states of r3 and r2 at various points in time (T0 310 through T4 350) during execution of exemplary instructions 305. The bit positions at the top of FIG. 3 do not necessarily correspond to particular bits of storage, but conceptually correspond to bits of the result of the extended multiplication operation as it is assembled. R2 and r3 may be stored in a register file, for example, during execution of instructions 305. In the illustrated embodiment, the low part of a register (L) contains bits 15:0 and the upper part (H) contains bits 31:16.

At point T0 310, the instruction "imul r2, r0L, r1L" (a 16-bit multiply) is performed, resulting in r2 receiving the 32-bit result of A[15:0]*B[15:0]. At this point, in the illustrated embodiment, computation of the lower 16 bits of the result is complete.

At point T1 320, the instruction "imad r3, r0H, r1L, r2H" is performed, resulting in r3 receiving the result A[31:16]*B[15:0]+(A[15:0]*B[15:0])[31:16]. Note that imad, in the illustrated embodiment, is a multiply-add instruction that takes two 16-bit operand multiplicands and a 16 or 32-bit addend and produces a 32-bit result. In this case, r2H is a 16-bit addend. At this point, in the illustrated embodiment, r3 contains intermediate values associated with bits 47:16 of the multiplication result.

At point T2 330, the instruction "imad r2H, r0L, r1H, r3L" is performed, resulting in r2H (the upper 16 bits of r2) receiving the result (A[15:0]*B[31:16]+A[31:16]*B[15:0]+(A[15:0]*B[15:0])[31:16])[15:0]. Note that in this embodiment, storing the results in r2H (rather than the entire register r2) causes r2H to receive the lower 16 bits of the result. In this embodiment, ALU 130 may be configured to write a result to only a portion of a storage element or signal for a result or operand such as S1 102 or fH 108 of FIG. 1, for example. At this point, in the illustrated embodiment, computation of the lower 32 bits of the result is complete.

At point T3 340, the instruction "imadh r3, r0L, r1H, r3" is performed, resulting in r3L receiving:

(A[15:0]*B[31:16]+A[31:16]*B[15:0]+(A[15:0]*B[15:0])[31:16])[31:16].

Imadh, in the illustrated embodiment, is a multiply-add and shift instruction indicating the operation (A*B+C)>>16 bits (or a different number of bits depending on the size of the input operands). Note that in this embodiment, the instructions at points T2 and T3 are nearly identical, with the difference being r3 instead of r3L as a final source. At this point, in the illustrated embodiment, computation of the lower 48 bits of the result is complete. Performing this instruction immediately after the previous instruction may have a low signal switch factor, since most of the inputs are not changing. This may reduce power consumption involved in performing a similar operation twice.

At point T4 350, the instruction "imad r3, r0H, r1H, r3" is performed, resulting in r3H receiving A[31:16]*B[31:16]. In this example, r3L remains the same because it is added to the result of the multiply and the multiply will not affect lower bits of the register. At this point, in the illustrated embodiment, computation of the entire multiplication result is complete.

In the illustrated embodiment, instructions 305 indicate five multiply operations, four add operations, and one shift operation. In the illustrated embodiment, these operations are grouped into one multiply instruction, three multiply-add instructions, and one multiply-add and shift instruction.

In the illustrated embodiment, after execution of the last instruction at point T4 350, registers r3 and r2 hold the 64-bit unsigned result of A[31:0] times B[31:0]. Performing multiplication according the technique disclosed in FIG. 3 does not require use of a carry flag, which may simplify register hardware. For example, an entirety of the information needed to perform an extended multiply (including during performance of the sequence of smaller operations) is stored in the source and destination registers and the instructions themselves, without requiring additional storage (e.g., for a carry flag) of information associated with intermediate multiplication results. This technique may utilize separate access to portions of source operands. Using similar techniques, extended multiplies of even greater sizes may be performed. Further, the techniques disclosed herein are not limited to the particular numbers of bits disclosed. Similar techniques may be used with signed or unsigned integer operands of 8, 16, 32, 64 bits, or any appropriate number of bits, and arithmetic may be performed using multipliers and/or adders configured to multiply any of various appropriate numbers of bits.

Referring now to FIG. 4A, a sequence of exemplary instructions for one embodiment of a signed extended multiply with 32-bit operands (signed_mul32) are shown. The instructions are similar to instructions 305 of FIG. 2, with the addition that the most significant portion of the operands must be treated as signed to preserve their sign, while lower portions are treated as unsigned. Extended signed integer multiplies of various sizes may be performed using similar techniques.

Referring now to FIG. 4B, a sequence of exemplary instructions for one embodiment of an unsigned extended multiply-add (unsigned_mad64) are shown. In this embodiment, the 64-bit result of r1 times r0 plus a 64-bit integer stored in r5 and r4 is stored in registers r3 and r2. In this embodiment, the multiplication requires six 32-bit multiply-add operations and one 32-bit add operation, and two shift operations. Alternately, the multiplication may be described as requiring two multiply-add and shift operations, four multiply-add operations, and one add operation. This description may be used in embodiments where multiply-add and shift is considered a single operation.

As discussed above with reference to FIG. 3, the exemplary techniques disclosed in FIGS. 4A-B may be implemented with operands, arithmetic units, and outputs of any of various numbers of bits. Further, other combinations of instructions in various sequences may be used to implement similar extended multiplications.

Referring now to FIG. 5 a flow diagram illustrating one exemplary embodiment of a method 500 for performing an extended multiply is shown. The method shown in FIG. 5 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 510.

At block 510, to perform a multiplication of two operands of a particular width, a sequence of multiply operations is performed using a multiplier circuit configured to perform multiplications of operands having a maximum width that is smaller than the particular width. The sequence of multiply operations may include one or more multiply-add operations, multiply-add and shift operations, multiply-subtract and shift operations, and/or multiply-subtract operations. The sequence of multiply operations may be performed without the use of a carry flag between any of the sequence of operations. Flow proceeds to block 520.

At block 520, portions of each of the two operands are used as inputs to the multiplier circuit for each of the sequence of multiply operations of block 510, and the portions are less than the entirety of each of the two operands. The portions may be upper and lower portions of the two operands. The portions may each be less than half of each of the two input operands. The portions may be stored in a storage element or provided as a transitory signal. Flow ends at block 520.

Figure 6:
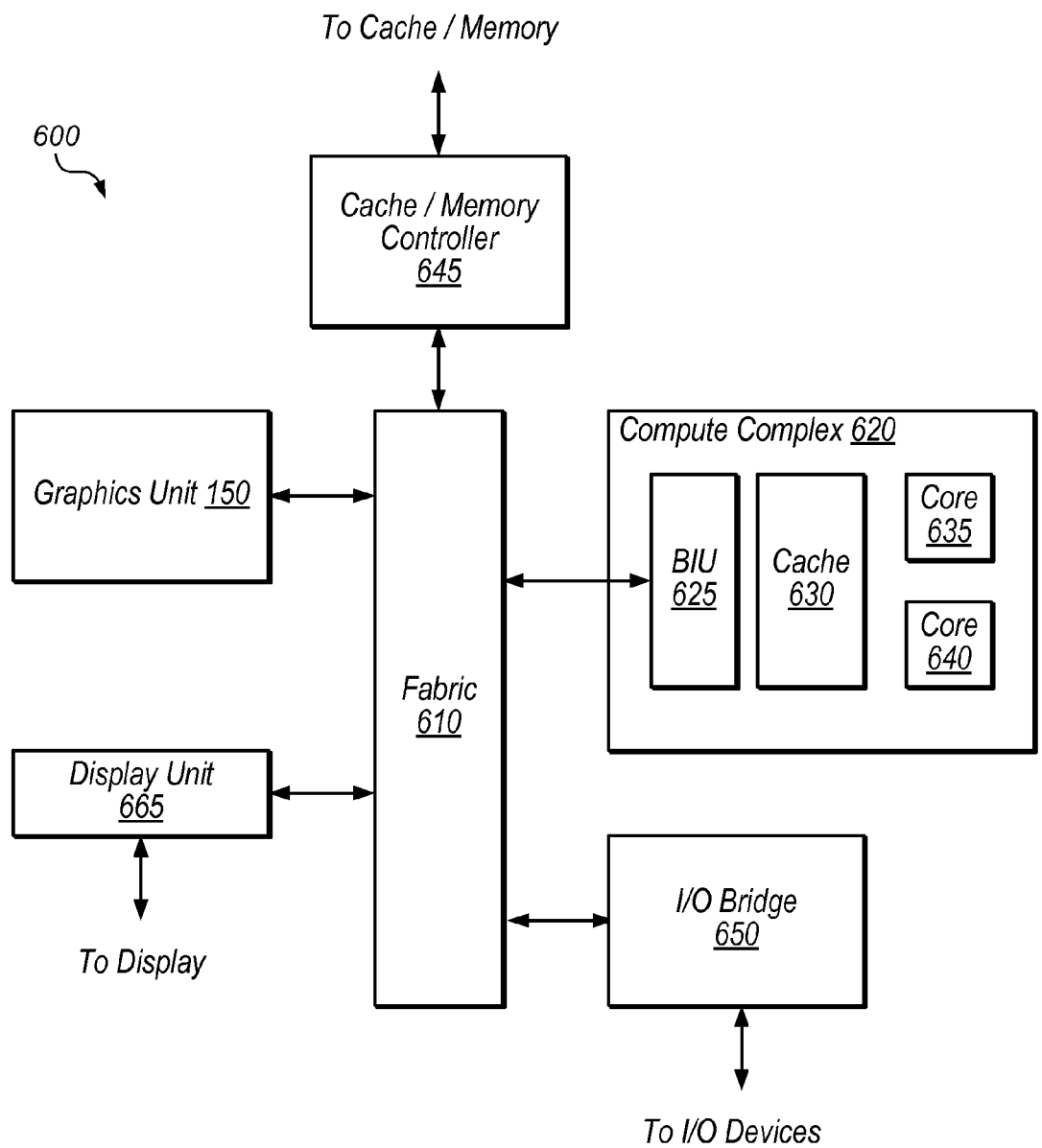
FIG. 6 is a block diagram illustrating one embodiment of a device that includes a graphics unit.

Referring now to FIG. 6, a block diagram illustrating an exemplary embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620, input/output (I/O) bridge 650, cache/memory controller 645, graphics unit 150, and display unit 665.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of cores and/or caches. For example, compute complex 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 150 may be described as "coupled to" a memory through fabric 610 and cache/memory controller 645. In contrast, in the illustrated embodiment of FIG. 6, graphics unit 150 is "directly coupled" to fabric 610 because there are no intervening elements.

Graphics unit 150 may include a plurality of execution instances for executing graphics instructions in parallel. Each execution instance may include an ALU such as ALU 130.

Graphics unit 150 may receive graphics-oriented instructions, such OPENGL® or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 650.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   multiplying, by a computer processor, two operands of a particular width in a base 2 representation and storing a result of the multiplying in one or more destination registers, wherein the multiplying includes:
   performing, by a multiplier circuit, a sequence of multiply operations, wherein the multiplier circuit is configured to perform multiplications of operands having a maximum width that is smaller than the particular width; and
   using, for each of the sequence of multiply operations, portions of each of the two operands as inputs to the multiplier circuit, wherein the portions are less than the entirety of each of the two operands and are represented in base 2;

wherein, for one or more of the sequence of multiply operations, the computer processor stores a result using only a portion of one of the one or more destination registers; and wherein the sequence of multiply operations is performed by the multiplier circuit without using a carry flag between any of the multiply operations.

2. The method of claim 1, wherein one or more of the sequence of multiply operations are multiply-add operations that utilize at least a portion of a stored result of a previous operation in the sequence of multiply operations.

3. The method of claim 1, wherein the operands have a width of N bits and wherein the multiplier circuit is configured to perform multiplications of operands having a maximum width of N/2 bits.

4. The method of claim 1, wherein the two operands are stored in respective first and second registers; and wherein the sequence of multiply operations includes:
multiplying a lower portion of the first register and a lower portion of the second register and storing the result in a third register;
performing a multiply-add operation, using an upper portion of the first register, the lower portion of the second register, and an upper portion of the third register as input operands, and storing the result in a fourth register;
performing a multiply-add operation using the lower portion of the first register, an upper portion of the second register, and a lower portion of the fourth register as input operands, and storing a portion of the result in the upper portion of the third register;
performing a multiply-add operation using the lower portion of the first register, the upper portion of the second register, and the fourth register as input operands, and storing the result in the fourth register; and
performing a multiply-add operation using the upper portion of the first register, the upper portion of the second register, and the fourth register as input operands and storing the result in the fourth register;
wherein, subsequent to the sequence of multiply operations, the third and fourth registers store a product of the two operands.

5. The method of claim 1, wherein the operands have a width of N bits and wherein the multiplier circuit is configured to perform multiplications of operands having a maximum width of N/4 bits.

6. The method of claim 1, wherein each of the portions is less than half of an entirety of one of the two operands.

7. The method of claim 1, wherein the sequence of multiply operations consists of:
one multiply operation;
three multiply-add operations; and
one multiply-add and shift operation.

8. The method of claim 1, wherein the sequence of multiply operations consists of:
five multiply operations;
four add operations; and
one shift operation.

9. The method of claim 1, wherein the multiplication is a signed integer multiplication.

10. An apparatus, comprising:
a multiply unit configured to perform multiplication of operands having a particular width a base 2 representation; and
a plurality of storage elements configured to store operands for the multiply unit, wherein each of the plurality of storage elements is configured to provide less than an entirety of a stored operand in response to a control signal from the apparatus;
wherein the apparatus is configured to perform a multiplication of given first and second operands having a width greater than the particular width by performing a sequence of multiply operations using the multiply unit; and
wherein each of the sequence of multiply operations uses only a portion, represented in base two, of a stored operand from one or more of the plurality of storage elements as an input operand to the multiply unit.

11. The apparatus of claim 10, wherein the apparatus is configured to perform the sequence of multiply operations without using a carry flag between multiply operations.

12. The apparatus of claim 10, wherein, for a signed integer multiplication, the apparatus is configured to treat most significant portions from one or more of the stored operands as signed integer values and is configured to treat remaining portions from one or more of the stored operands as unsigned integer values.

13. The apparatus of claim 10, further comprising:
an add unit; and
a shift unit;
wherein the sequence of multiply operations includes one or more multiply-add operations and one or more multiply-add and shift operations, wherein the apparatus is configured to perform the one or more multiply-add operations using the add unit and the one or more multiply-add and shift operations using the shift unit.

14. The apparatus of claim 10,
wherein each of the portions of the stored operands are either upper portions or lower portions of the stored operands.

15. The apparatus of claim 10,
wherein, for one or more of the sequence of multiply operations, the apparatus is configured to store a result using only a portion of one of one or more destination registers; and
wherein one or more of the sequence of multiply operations are multiply-add operations that utilize at least a portion of a stored result of a previous operation in the sequence of multiply operations.

16. The apparatus of claim 10, wherein the sequence of multiply operations consists of:
one multiply operation;
three multiply-add operations; and
one multiply-add and shift operation.

17. The apparatus of claim 10, wherein the sequence of multiply operations consists of:
one multiply operation;
four multiply-add operations; and
one shift operation.

18. The apparatus of claim 10, wherein the apparatus is further configured to perform a multiply and add operation of first, second, and third operands having a greater width than the particular width by performing the sequence of multiply operations.

19. The apparatus of claim 10, wherein the apparatus is configured to perform a multiply and subtract operation of first, second, and third operands having a greater width than the particular width by performing the sequence of multiply operations.

20. A method, comprising:
performing, by an execution unit, a sequence of operations including at least one multiply-add operation and at least one multiply-add and shift operation, using a multiplier circuit configured to perform multiplications of operands having a particular maximum width;

using, for each of the sequence of operations, only a portion of each of two operands, wherein the portions are less than the entirety of each of the two operands, wherein the portions are represented in radix 2, and wherein each of the two operands is larger than the particular maximum width; and storing a result of the sequence of operations in one or more destination registers;

wherein, for one or more of the sequence of operations, the result is stored using only a portion of one of the one or more destination registers; and wherein performing the sequence of operations is performed without storing information generated by any of the sequence of operations other than in destination registers of a multiplication operation of the two operands.

* * * * *